US009045816B2

(12) United States Patent
Oishi et al.

(10) Patent No.: US 9,045,816 B2
(45) Date of Patent: Jun. 2, 2015

(54) MAGNESIUM WELDING WIRE

(75) Inventors: Yukihiro Oishi, Hyogo (JP); Nozomu Kawabe, Hyogo (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 2309 days.

(21) Appl. No.: 11/886,872

(22) PCT Filed: Feb. 20, 2006

(86) PCT No.: PCT/JP2006/302982
§ 371 (c)(1),
(2), (4) Date: Sep. 21, 2007

(87) PCT Pub. No.: WO2006/100860
PCT Pub. Date: Sep. 28, 2006

(65) Prior Publication Data
US 2009/0032515 A1    Feb. 5, 2009

(30) Foreign Application Priority Data
Mar. 22, 2005  (JP) .................. P.2005-082293

(51) Int. Cl.
B23K 35/22    (2006.01)
C22C 23/02    (2006.01)
B21C 1/00     (2006.01)
B23K 35/28    (2006.01)
B23K 35/40    (2006.01)
C22C 23/00    (2006.01)
C22C 23/04    (2006.01)
C22F 1/06     (2006.01)

(52) U.S. Cl.
CPC .............. *C22C 23/02* (2013.01); *B21C 1/003* (2013.01); *B23K 35/284* (2013.01); *B23K 35/40* (2013.01); *C22C 23/00* (2013.01); *C22C 23/04* (2013.01); *C22F 1/06* (2013.01)

(58) Field of Classification Search
CPC ...... B21C 1/003; B23K 35/284; B23K 35/40; C22C 23/02; C22C 23/04; C22C 23/00
USPC ............. 219/146.22, 146.24, 145.1; 148/666, 148/667, 420; 420/402; 29/557, 558, 33 F; 428/293, 646
See application file for complete search history.

(56) References Cited

U.S. PATENT DOCUMENTS

| | | | | |
|---|---|---|---|---|
| 2,054,054 A | * | 9/1936 | Jarman | 428/646 |
| 2,149,436 A | * | 3/1939 | Hadenfeldt et al. | 72/364 |
| 2,233,928 A | * | 3/1941 | Weaver | 29/33 F |
| 2,750,311 A | * | 6/1956 | Snyder et al. | 148/667 |
| 3,157,093 A | * | 11/1964 | Shaw et al. | 409/293 |
| 3,469,974 A | * | 9/1969 | Ziegler et al. | 420/412 |
| 3,760,488 A | * | 9/1973 | Cucuz et al. | 29/557 |
| 3,911,541 A | * | 10/1975 | Ziemek et al. | 29/33 F |
| 4,913,927 A | * | 4/1990 | Anderson | 427/580 |
| 4,973,393 A | * | 11/1990 | Mino et al. | 148/535 |
| 4,990,198 A | * | 2/1991 | Masumoto et al. | 148/403 |
| 4,997,622 A | * | 3/1991 | Regazzoni et al. | 420/407 |
| 5,078,962 A | * | 1/1992 | Regazzoni et al. | 420/402 |
| 5,316,598 A | * | 5/1994 | Chang et al. | 148/420 |
| 6,449,997 B1 | | 9/2002 | Bertolini | |
| 6,791,064 B2 | * | 9/2004 | Lee et al. | 219/145.1 |
| 6,989,510 B2 | * | 1/2006 | Yamaoka et al. | 219/145.1 |
| 7,485,829 B2 | * | 2/2009 | Konishi et al. | 219/145.1 |
| 7,626,139 B2 | * | 12/2009 | Matsuguchi et al. | 219/145.1 |
| 7,666,351 B2 | * | 2/2010 | Nishikawa et al. | 420/409 |
| 7,687,738 B2 | * | 3/2010 | Ly | 219/69.12 |
| 7,807,948 B2 | * | 10/2010 | Katiyar | 219/145.22 |
| 2002/0014477 A1 | | 2/2002 | Lee et al. | |
| 2003/0000608 A1 | * | 1/2003 | Horie et al. | 148/666 |
| 2004/0084173 A1 | * | 5/2004 | Nishikawa et al. | 164/482 |
| 2004/0163744 A1 | * | 8/2004 | Oishi et al. | 148/667 |
| 2007/0023114 A1 | | 2/2007 | Oishi et al. | |

FOREIGN PATENT DOCUMENTS

| | | | | |
|---|---|---|---|---|
| CN | 1513063 A | | 7/2004 | |
| DE | 10142204 A1 | * | 3/2003 | ............. B21C 37/04 |
| JP | 53-17539 | | 2/1978 | |
| JP | 55-86696 | | 6/1980 | |
| JP | 58-93595 | | 6/1983 | |
| JP | 2002-086290 | | 3/2002 | |
| JP | 3592310 | | 9/2004 | |
| JP | 2005-66622 | | 3/2005 | |
| JP | 2006-16655 | | 1/2006 | |
| SU | 572355 A | * | 9/1977 | ............. B23K 35/30 |
| SU | 585940 A | * | 2/1978 | ............. B23K 35/28 |
| SU | 776825 B | * | 11/1980 | ............. B23K 35/28 |

OTHER PUBLICATIONS

International Preliminary Report on Patentability issued in International Application No. PCT/JP2006/302982, dated Mar. 6, 2008.
Chinese Office Action, w/ English translation thereof, issued in Chinese Patent Application No. CN 2006800092045 dated Jul. 31, 2009.
Extended European Search Report issued in European Patent Application No. 06714122.6-1215/1867428 PCT/JP2006302982, dated May 3, 2010.
Japanese Notification of Reason for Refusal, w/ English translation thereof, issued in Japanese Patent Application No. JP 2005-082293 dated Feb. 7, 2011.
Canadian Office Action issued in Canadian Application No. 2,602,095 dated May 29, 2013.
Japanese Office Action issued in Application No. 2011-160232 dated Jun. 10, 2013.

* cited by examiner

Primary Examiner — Thien S Tran
(74) Attorney, Agent, or Firm — McDermott Will & Emery LLP

(57) ABSTRACT

It is an object of the invention to provide a magnesium welding wire excellent in surface cleanliness and a method for manufacturing the same.
A welding wire according to the invention can be manufactured by drawing a base material such as an extruded material made of pure magnesium or a magnesium-based alloy and, after then, by shaving the surface of the thus drawn wire. Execution of the shaving operation makes it possible not only to effectively remove a lubricant and a coating used in the drawing operation but also to effectively remove an oxide generated during the drawing operation. Thanks to this, the thus obtained welding wire is excellent in surface cleanliness. As a lubricant to be used in the drawing operation, preferably, there may be used an oil lubricant or a wet-type lubricant which can be removed easily by a cleaning operation or by a grease removing treatment.

3 Claims, No Drawings

MAGNESIUM WELDING WIRE

RELATED APPLICATIONS

This application is the U.S. National Phase under 35 U.S.C. §371 of International Application No. PCT/JP2006/302982 filed on Feb. 20, 2006, which in turn claims the benefit of Japanese Application No. 2005-082293, filed on Mar. 22, 2005, the disclosures of which Applications are incorporated by reference herein.

TECHNICAL FIELD

The present invention relates a welding wire made of pure magnesium or a magnesium-based alloy and a method for manufacturing such welding wire. Especially, the invention relates to a magnesium welding wire which can provide both excellent surface cleanliness and excellent weldability.

BACKGROUND ART

Mg has specific gravity (density g/cm$^3$, 20° C.) of 1.74 and is the lightest in all metal materials that are used for a structure. Also, Mg has high electric conductivity and vibration absorbing characteristic and thus can be expected as a lightweight material for use in various fields which require these characteristics. Recently, with development of wrought alloys such as a rolled material or an extruded material made of a magnesium-based alloy the major component of which is the above-mentioned Mg, the necessity of welding such wrought alloy has been increasing. As the welding wire made of a magnesium-based alloy, there is known a welding wire which is disclosed in the patent reference 1. This welding wire is manufactured by drawing an extruded material.
[Patent Reference 1]
Japanese Patent No. 3592310, paragraphs 0087, 0091

DISCLOSURE OF THE INVENTION

Problems to be Solved by the Invention

A welding wire is required to be excellent in surface cleanliness. Here, when drawing a work piece or a base material using a die, normally, in order to reduce frictional resistance between the base material and die, a lubricant is applied onto the surface of the base material; or, in order to facilitate the drawing of the lubricant into the die, a coating is formed on the surface of the base material. Such lubricant and coating can be truly removed to some degree by cleaning the surface of the thus worked material or welding wire using an alkali solution or the like and thus the surface of the worked material or welding wire can be cleaned. But, especially, a coating formed by a coating forming treatment is difficult to remove completely by the alkali cleaning. In other words, there is a fear that the lubricant or coating can be left on the surface of the thus produced welding wire. When the lubricant or coating is left on the surface of the welding wire, the surface cleanliness thereof is lowered, which makes it difficult to carry out a stable welding operation.

On the other hand, as regards the magnesium-based alloy, since it generally provides a poor plastic working characteristic at room temperatures, in most cases, it is plastic worked at high temperatures of 250° C. or higher. When a drawing operation is carried out at such high temperatures, because Mg is active metal, there is produced an oxide on the surface of a magnesium-based alloy material. And, the inventors have found that the weldability of the magnesium-based alloy can be lowered due to the oxide.

In view of the above conventional circumstances, it is a main object of the invention to provide a magnesium welding wire which is excellent in both surface cleanliness and weldability. And, it is another object of the invention to provide an optimum method for manufacturing the above-mentioned magnesium welding wire.

Means for Solving the Problems

The present invention attains the above objects by enforcing a surface working operation to effectively remove a lubricant, an oxide and the like existing on a wire material (or a base material). That is, according to the invention, there is provided a magnesium welding wire including: a base material made of pure magnesium or a magnesium-based alloy, wherein a shaving operation is enforced on the surface of the base material. Also, such welding wire can be manufactured according to the following manufacturing method. In other words, a magnesium welding wire manufacturing method according to the invention includes a step of preparing a base material made of pure magnesium or a magnesium-based alloy, a step of drawing the base material, and a step of shaving the surface of the thus drawn material. Also, another magnesium welding wire manufacturing method according to the invention includes a step of preparing a base material made of pure magnesium or a magnesium-based alloy, a step of shaving the surface of the base material, and a step of drawing the base material having the thus shaved surface.

Now, description will be given below in detail of the invention.

In the invention, the term "magnesium" means so called pure magnesium which is made of Mg and impurities, or a magnesium-based alloy which is made of an additional element, Mg and impurities. As the additional element, for example, of a group of elements Al, Zn, Si, Cu, Ag, Y, Zr and the like, there can be used at least one element. Or, the magnesium-based alloy may also include more than one element that is selected from the above-mentioned element group. Since such additional element is contained, the magnesium welding wire of the invention is excellent in strength, elongation, high temperature strength, corrosion resistance and the like. The content of the additional element may preferably be 20% by mass or less in total. When the additional element exceeds 20% by mass, there is generated a cause for the breakage or the like of the material when it is cast. As a more specific composition which contains the additional element, for example, there can be pointed out the following compositions.

I. A composition which includes Al: 0.1~12% by mass and the remaining portions of which are Mg and impurities.

II. A composition which includes one or more elements selected from Al: 0.1~12% by mass, and a group of three elements, Mn: 0.1~2.0% by mass, Zn: 0.1~5.0% by mass, and Si: 0.1~5.0% by mass, and the remaining portions of which are Mg and impurities.

III. A composition which includes Zn: 0.1~10% by mass and Zr: 0.1~2.0% by mass, and the remaining portions of which are Mg and impurities.

By the way, the impurities may include an element which is not added significantly, or may include an element which is added significantly (an additional element).

As a magnesium-based alloy having the above composition, there may be used a magnesium-based alloy having a typical composition which belongs to an AZ system, an AS system, an AM system, a ZK system or the like according to an ASTM symbol. As the AZ system magnesium-based alloy, for example, there are available AZ10, AZ21, AD31, AZ61, and AZ91; as the AS system magnesium-based alloy, for example, there are available AS21 and AS41; as the AM system magnesium-based alloy, there are available AM60 and AM100; and, as the ZK system magnesium, there are available ZK40 and ZK60.

A magnesium welding wire according to the invention is manufactured by enforcing a shaving operation and a drawing operation on a base material made of pure magnesium or a magnesium-based alloy. As the base material, there is known a material which can be produced by solving and casting pure magnesium or a magnesium-based alloy having the above-mentioned composition and then enforcing a rolling operation or an extrusion operation on the thus produced cast material. More specifically, there are available a rolled material obtained by rolling the cast material, an extruded material obtained by extruding such rolled material, an extruded material obtained by extruding the cast material, and a rolled material obtained by further rolling such extruded material. The rolling operation and extruding operation may be executed under the well-known conditions. Also, there may also be used a rolled material or an extruded material which is sold on the market.

In the present invention, the shaving operation may be carried out using a cutting tool or using a shaving die. As the cutting tool and shaving die, there can be used well-known cutting tool and shaving die. When using the shaving die, even if a base material to be shaved is long, a shaving operation can be enforced easily on the whole length of the base material. When it comes to the quantity of a base material to be removed by the shaving operation, there may be pointed out the area of the work material the distance (depth) of which is in the range of several dozens μm~200 μm from the surface thereof. Since, regardless of the diameter of the work material, at least the area of the work material up to the depth of several dozens μm from the surface thereof is removed, there can be provided an effect that the lubricant, coating and oxide left on the surface of the worked material can be removed to thereby enhance the surface cleanliness of the welding wire. The larger the quantity to be removed is, the more sufficiently the lubricant, coating and oxide can be removed; however, if the quantity of removal is excessively large, the yield rate of the welding wire is worsened. Therefore, when taking the productivity into account, the proper upper limit of the quantity of removal may be the area of the base material which is deep about 200 μm from the surface thereof. Such shaving operation may be carried out before execution of a drawing operation, or may be carried out while a drawing operation is being executed (between passes), or may be carried out after execution of a drawing operation; and, the shaving operation may also be carried out one time or more than one time. For example, the shaving operation may be carried out not before and after execution of the drawing operation. That is, according to the invention, the base material may be drawn to produce a drawn wire having a given diameter and then the surface of the drawn wire may be shaved; or, the base material may be drawn to produce a drawn wire having a given diameter, the surface of the drawn wire may be shaved, and, after then, the surface shaved material may be further drawn to produce a drawn wire having a given diameter; or, the surface of the base material may be shaved and the surface shaved material may be drawn thereby provide a drawn wire having a given diameter.

In the present invention, the wire drawing operation may be carried out using a wire drawing die or a roller die. Especially, when the wire drawing operation is executed using the wire drawing die, there can be easily manufactured a wire which is small in the diameter difference (the difference between the values of the maximum and minimum diameters in the same transverse section of the wire) and is thus excellent in dimensional precision. A welding wire is required to excellent both in surface cleanliness and in dimensional precision. Therefore, the drawing operation may preferably be carried out by using the wire drawing die rather than the roller die. Also, thanks to execution of the drawing operation, the structure of the wire can be fined and thus the wire can also be made excellent in strength and toughness. In order for the wire to be able to have a desired size, the above-mentioned drawing operation may be carried out in more than one pass using dies the die holes of which are different in size from each other in such a manner that the dies are arranged in a multistage. The conditions of the drawing operation may be as follows: that is, a temperature rising speed up to a drawing temperature is $1°$ C./sec $100°$ C./sec; a drawing temperature is in the range of $50°$ C. or higher to $200°$ C. or lower (preferably, $100°$ C. or higher, more preferably, $150°$ C. or higher); a drawing degree is 10% or more/pass; a draw speed is 1 m/min or more; and, a cooling speed after the drawing operation is $0.1°$ C./sec. The higher the drawing temperature is, the more the drawing workability of the base material can be enhanced; for example, the drawing operation of the base material with a high drawing degree is possible. Also, when the drawing operation is carried out over more than one pass, an intermediate heat treatment may also be enforced every pass or every more than one pass (for example, every two or three passes) to thereby recover the distortion of the drawn wire caused by the drawing operation and facilitate the fining of recrystallized grain. The intermediate heat treatment may be enforced under the following conditions: that is, a heating temperature, in the range of $100°$ C. or higher to $400°$ C. or lower (preferably, $150°$ C. or higher); and, a holding time, about 5~20 minutes. Or, instead of execution of the heat treatment, the base material may be drawn at room temperatures. When a drawing operation is carried out at room temperatures, preferably, it may be carried out in such a manner that the drawing degree per pass is reduced (although depending on the composition of the alloy, generally 15% or less, preferably, 10% or less); or, firstly, a previous heat treatment may be enforced on the base material before the base material is drawn to thereby fine the crystals of the base material and thus enhance the drawing workability of the base material, and, after then, the base material may be drawn. As the conditions for the previous heat treatment to be carried out before the drawing operation, there may be as follows. That is, a heating temperature: $200°$ C. or higher to $450°$ C. or lower (preferably, $250°$ C. or higher to $400°$ C. or lower); and, a holding time, about 15~60 minutes. Further, as a condition for execution of the drawing operation at room temperatures may include a drawing speed: 1 m/min or more.

The above-mentioned drawing operation may preferably be executed using a lubricant. The lubricant may be a dry-type lubricant mainly including metal soap, or may be an oil lubricant mainly including animal oil, vegetable oil or mineral oil, or a wet-type lubricant made of an oil lubricant dispersed and emulsified into water. When using the dry-type lubricant, in order to facilitate the drawing of the lubricant into a die, a film coating treatment may be previously enforced on the surface of a base material to be drawn. When a drawing operation has been executed on the base material using the lubricant, after end of the drawing operation, a cleaning treatment such as an alkali cleaning operation or a grease removing treatment should be enforced on the surface of the drawn wire to thereby remove the lubricant and coating therefrom as much as possible. The oil lubricant and wet-type lubricant can be removed easily by the grease removing treatment. Therefore, when enhancement in the surface cleanliness of the drawn wire is taken into account, at least the final drawing operation (in the final pass) may preferably be carried out using the oil lubricant or wet-type lubricant; and, the oil lubricant or wet-type lubricant may also be used in all passes in the drawing operation. Or, a drawing operation using the dry-type lubricant and a drawing operation using the oil lubricant or wet-type lubricant may also be executed in combination. For example, the drawing operation may also be carried out using different kinds of lubricants in such a manner that the dry-type lubricant is used in passes in the early stage, whereas the wet-type lubricant or oil lubricant is used in passes in the late stage. Of the above-mentioned lubricants, the oil lubricant is most preferred because it does not contain water which can react with Mg.

As described above, according to the invention, the working sequence of the drawing operation and shaving operation does not matter. When the drawing operation is executed first and the shaving operation is enforced last, that is, when the shaving operation is enforced on the drawn wire produced by drawing a base material, not only the lubricant or coating used in the drawing step can be removed sufficiently by the shaving operation but also oxides produced on the surface of the base material in the drawing step can be removed effectively by the shaving operation. Also, since a cleaning treatment or a grease removing treatment is enforced before or after the shaving operation, the lubricant or the like can be removed more positively. Therefore, the drawing operation to be carried out before the shaving operation may also be carried using any one of the wet-type, dry-type and oil lubricants. The magnesium welding wire of the invention obtained according to the above-mentioned manufacturing method can provide a welding wire which is especially excellent in surface cleanliness.

As described above, by enforcing the shaving operation after the drawing operation, there can be obtained a welding wire which is excellent in surface cleanliness. However, when a drawn wire to be shaved is long, there is a fear that the shaving die can be worn and the diameter of the drawn wire can be thereby varied. As described above, the welding wire is required that it is excellent not only in surface cleanliness but also in dimensional precision. In view of this, after the shaving operation is enforced on the surface of the drawn wire, for the purpose of adjustment of the dimension of the surface shaved wire, a further drawing operation may also be executed on the surface of the shaved material only in one pass. In order that, after execution of the drawing operation for the purpose of such dimensional adjustment, the lubricant can be removed easily and positively by a cleaning treatment or a grease removing treatment, preferably, the drawing operation may be carried out using the oil lubricant or wet-type lubricant. Also, since the drawing operation to be executed after the shaving operation aims at adjusting the dimension of the shaved material, the draw working degree thereof may be small, for example, it may be in the order of 3~10%. Thus, owing to such low draw working degree, the shaved material can be drawn sufficiently even at room temperatures. Depending on the composition of the magnesium-based alloy, the draw working degree can be increased up to about 15% even at room temperatures. In the case of a cold draw working in which a drawing operation is executed at room temperatures, when compared with a warm draw working or a hot draw working in which a drawing operation is executed while the base material is being heated, it is possible to reduce a possibility that oxides can be newly generated on the surface of the drawn wire due to heating. When the drawing operation is executed in the heated state, the draw working temperature may preferably be set as low as possible, for example, about 50~150° C. And, by enforcing a cleaning treatment or a grease removing treatment after the drawing operation, there can be easily obtained a welding wire which is excellent in both surface cleanliness and dimensional precision.

In the case of the welding wire of the invention obtained in the above-mentioned manner by enforcing the shaving operation after execution of the final drawing operation, and also in the case of the welding wire of the invention obtained in the above-mentioned manner by enforcing the drawing operation in one pass for the purpose of dimensional adjustment after execution of the shaving operation, since the surface side of the welding wire is mainly worked, this surface side becomes higher in hardness than the central portion side of the welding wire. Specifically, the Vickers hardness at the position of the worked material existing 50 μm deep from the surface thereof is higher by 10 or more than the Vickers hardness in the central portion of the same worked material. In this manner, the welding wire of the invention is provided as a worked material the surface of which is hardened due to execution of the shaving operation in the final step.

On the other hand, the shaving operation, as described above, may be carried out after the drawing operation but it may also be carried out before the drawing operation or during the drawing operation. For example, a shaving operation may be enforced firstly on the surface of a base material such as an extruded material or a rolled material and, after then, a drawing operation may be executed on the thus surface shaved material. Or, after a drawing operation is enforced on a base material such as an extruded material or a rolled material to some degree, a shaving operation may be executed on the surface of the thus drawn material, and another drawing operation may be further executed on the surface shaved material in more than one pass. Because of enforcement of the shaving operation on the surface of the base material (extruded material or rolled material) prior to execution of the drawing operation, oxides possibly generated when the base material is produced by rolling or by extrusion can be removed effectively. Also, owing to enforcement of a shaving operation on the surface of a drawn wire while it is being drawn, oxides generated by the drawing operation up to the shaving operation and lubricant used in the drawing operation can be removed effectively. When carrying out the shaving operation during the drawing operation, and also when carrying out the shaving operation before the drawing operation, especially, after execution of the final drawing operation, a cleaning treatment or a grease removing operation is carried out to thereby make clean the surface of the worked material. Also, in order that the lubricant and the like can be removed easily and fully by a cleaning treatment or by a grease removing treatment, preferably, the final drawing operation may be carried out using an oil lubricant or a wet-type lubricant.

As regards the shaving operation, when it is enforced on a base material in a stage where the diameter of the base material is large, the ratio of the quantity of removal of the base material is small accordingly, thereby being able to provide a better yield. However, when, after the base material is shaved, the shaved material is drawn in more than one pass, the lubricant, coating and oxides are easy to be left on the surface of the drawn material. Especially, when the drawing operation is carried out on the base material in such a manner that the base material is heated in order to increase the draw working degree thereof, or when an intermediate heat treatment or a previous heat treatment is carried out on the base material in order to enhance the drawing workability thereof, the quantity of oxides generated increases. Therefore, when the drawing operation is executed in more than one pass after execution of the shaving operation, preferably, it may be executed at as low as possible temperatures (in the range of room temperatures to about 150° C.). Or, as described above, when the drawing operation is carried out in such a manner that the work material is heated up to 50° C. or higher and the draw working degree thereof is thereby enhanced, in addition to enforcement of the shaving operation before or during the drawing operation, a further shaving operation may also be carried out properly after execution of the drawing operation. Especially, when a shaving operation is carried out after execution of the final drawing operation, as described above, the oxides generated in the wire drawing operation and the lubricant used during the drawing operation can be removed sufficiently by this shaving operation. By enforcing the shaving operation several times in this manner, there can be obtained a welding wire which is excellent in both surface cleanliness and dimensional precision.

A welding wire according to the invention preferably may have a circular-shaped section. Also, the diameter of the welding wire, preferably, may be in the order of 0.8~4.0 mm.

Effects of the Invention

In a magnesium welding wire according to the invention, a lubricant and coating used in a wire drawing operation as well as an oxide generated in the wire drawing operation can be removed effectively by a shaving operation; and, therefore, the present magnesium welding wire provides excellent surface cleanliness. Thus, when the magnesium welding wire according to the invention is used, a stable welding operation can be realized. Also, since the magnesium welding wire according to the invention is excellent in dimensional precision as well, it can be fully applied to an automatic welding machine including a take-up reel.

BEST MODE FOR CARRYING OUT THE INVENTION

Now, description will be given below of an embodiment of the invention.

Test Example 1

There is prepared an extruded material made of an AZ31 equivalent alloy (which contains, by mass %, Al: 3.0%, Zn: 1.0%, and Mn: 0.15%, and Mg and impurities as the remaining contents thereof; the composition is examined according to a chemical analysis) and having a diameter of 4.0 mm. A drawing operation is enforced on this extruded material under the following conditions to thereby produce a welding wire having a diameter of 2.0 mm. The drawing operation (drawing of the extruded base material) is carried out in more than one pass using drawing dies while these drawing dies are arranged in multiple stages. Also, the drawing operation is carried out using a dry-type lubricant or an oil lubricant. As the dry-type lubricant, there is used metal soap and a coating forming treatment is enforced on the surface of the extruded base material. As the oil lubricant, there is used mineral oil. Further, every 2~3 passes, an intermediate heat treatment is enforced properly on the extruded base material once to three times or so.

Sample (a): a wire drawing operation is executed on the base material down to a diameter ø of 2.2 mm using a dry-type lubricant (draw working temperature: 100~150° C., draw working degree: 10~20%/pass, temperature rising speed to the draw working temperature: about 1° C./sec, and drawing speed: 10~20 m/min), and a shaving operation is enforced on the surface of the thus drawn wire to thereby reduce the diameter ø down to 2.0 mm. After the shaving operation, a grease removing treatment is enforced on the surface shaved material using an organic solvent.

Sample (b): a drawing operation is executed on the base material down to a diameter of 2.2 mm using an oil lubricant (draw working temperature: 100~150° C., draw working degree: 10~20%/pass, temperature rising speed to the draw working temperature: about 1° C./sec, and drawing speed: 10~20 m/min), and a shaving operation is enforced on the surface of the thus drawn wire to thereby reduce the diameter ø down to 2.0 mm. After the shaving operation, a grease removing treatment is enforced on the surface shaved material using an organic solvent.

Sample (c): a drawing operation is executed on the base material until the diameter ø thereof is reduced down to 2.3 mm using a dry-type lubricant, a shaving operation is executed on the surface of the thus drawn wire so as to provide the diameter ø of 2.1 mm, a drawing operation is executed on the thus surface shaved material in one pass using an oil lubricant so as to provide the diameter ø of 2.0 mm (draw working temperature: room temperature, and draw working degree: 9%). Conditions for the drawing operation executed until the diameter ø of the base material is reduced down to 2.3 mm are similar to the sample (a). After execution of the drawing operation using an oil lubricant, a grease removing treatment using an organic solvent is enforced on the thus worked material.

Sample (d): a drawing operation is executed on the base material until the diameter ø of the base material is reduced down to 2.0 mm using a dry-type lubricant, after the drawing operation, the surface of the thus drawn wire is alkali cleaned and also a grease removing treatment is enforced on the alkali cleaned wire surface using an organic solvent. Conditions for the drawing operation executed on the sample (d) are similar to the sample (a).

Sample (e): a drawing operation is executed on the base material until the diameter ø thereof is reduced down to 2.0 mm using an oil lubricant, after the drawing operation, the surface of the thus drawn wire is alkali cleaned and also a grease removing treatment is enforced on the alkali cleaned wire surface using an organic solvent. Conditions for the drawing operation executed on the sample (e) are similar to the sample (b).

Sample (f): a drawing operation is executed on the base material until the diameter ø thereof is reduced down to 2.0 mm using a dry-type lubricant, after the drawing operation, no cleaning operation is executed but only the grease removing treatment is enforced on the surface of the thus drawn wire using an organic solvent. Conditions for the drawing operation executed on the sample (f) are similar to the sample (a).

Sample (g): a drawing operation is executed on the base material until the diameter ø thereof is reduced down to 2.0 mm using an oil lubricant, after the drawing operation, no cleaning operation is executed but only the grease removing treatment is enforced on the surface of the thus drawn wire using an organic solvent. Conditions for the drawing operation executed on the sample (g) are similar to the sample (b).

Sample (h): a shaving treatment is enforced on the surface of the extruded material to thereby reduce the diameter ø thereof down to 3.8 mm, and a drawing operation is executed on the thus surface shaved material until the diameter ø of the surface shaved material is reduced down to 2.0 mm using an oil lubricant. Conditions for the wire drawing operation executed on the sample (h) are similar to the sample (b). After the drawing operation, a grease removing treatment is enforced on the thus worked material using an organic solvent.

Sample (i): a drawing operation is carried out on the extruded material until the diameter ø thereof is reduced down to 3.0 mm using a dry-type lubricant, a shaving operation is executed on the thus drawn wire so as to provide the diameter ø of 2.8 mm, and another drawing operation is executed on the surface of the thus surface shaved material until the diameter ø thereof is reduced down to 2.0 mm using an oil lubricant. Conditions for the drawing operation using the dry-type lubricant are similar to the sample (a), while conditions for the drawing operation using the oil lubricant are similar to the sample (b). After execution of the drawing operation using the oil lubricant, a grease removing treatment is carried out on the surface of the thus worked material using an organic solvent.

Sample (j): a shaving treatment is enforced on the surface of the extruded material until the diameter ø thereof is reduced down to 3.8 mm, a drawing operation is then executed on the thus surface shaved material until the diameter ø thereof is reduced down to 2.0 mm using a dry-type lubricant, and another shaving treatment is executed on the surface of the thus drawn wire to thereby reduce the diameter ø thereof down to 2.0 mm. Conditions for the wire drawing operation executed on the sample (j) are similar to the sample (a). After the shaving operation, a grease removing treatment is enforced on the surface of the thus worked material using an organic solvent.

A welding test is conducted on the thus obtained welding wire to evaluate the weldability thereof. In the present test, a joint efficiency by butting welding is measured and, according to the measured joint efficiency, the weldability of the welding wire is evaluated quantitatively. Specifically, there are prepared pipes each made of an AZ31 alloy having an outside diameter of 25 mm, a thickness of 1.5 mm and a tensile strength (TS)=265 MPa; the pipes are welded together by TIG welding using the above-mentioned welding wires (a)~(j); and, a tensile test is conducted on the thus welded pipes to find the joint efficiency (%)=(the TS of the pipes after welded)/(the TS of the pipes before welded). In the present test, the height of weld overlay is uniformed to ø 28 mm. Also, as the welding pipes, there are prepared five pipes (n=5) and the TS of the pipes after welded is obtained using the average TS of these five pipes. The results are shown in Table 1. The higher the joint efficiency is, the more excellent the weldability is. Also, in the transverse section of each of the above obtained welding wires (a)~(j), the Vickers hardness (HV) (surface hardness) of the position of the welding wire existing 50 μm deep from the surface thereof and the Vickers hardness (HV) (center hardness) of the central portion thereof are measured, and a difference between them is found. The results are also shown in Table 1. By the way, in Table 1, the term "(dry type)" expresses a drawing operation using a dry-type lubricant, whereas "(oil)" represents a drawing operation using an oil lubricant.

TABLE 1

| Samples | Steps | Surface hardness (HV) | Center hardness (HV) | Surface hardness – Center hardness (HV) | Joint efficiency (%) |
|---|---|---|---|---|---|
| a | Drawing operating (dry type) → Shaving operation | 91 | 73 | 18 | 92.2 |
| b | Drawing operation (oil) → Shaving operation | 90 | 74 | 16 | 94.0 |
| c | Drawing operation (dry type) → Shaving operation → Shaving operation (oil) | 95 | 81 | 14 | 90.1 |
| d | Drawing operation (dry type) → Alkali cleaning operation | 80 | 75 | 5 | 65.4 |
| e | Drawing operation (oil) → Alkali cleaning operation | 79 | 73 | 6 | 71.8 |
| f | Drawing operation (dry type) | 81 | 74 | 7 | 53.9 |
| g | Drawing operation (oil) | 80 | 75 | 5 | 69.2 |
| h | Shaving operation → Drawing operation (oil) | 81 | 74 | 7 | 88.7 |
| i | Drawing operation (dry type) → Shaving operation → Drawing (oil) | 83 | 73 | 10 | 89.9 |
| j | Shaving operation → Drawing operation (dry type) → Shaving operation | 92 | 72 | 20 | 93.2 |

As shown in Table 1, the samples (a), (b), (c), (h), (i) and (j), on which a shaving operation is enforced, show a high joint efficiency when compared with the sample on which the shaving operation is not enforced. Especially, the samples (a), (b) and (j), on which a shaving operation is enforced after execution of a drawing operation, and the sample (c), on which a drawing operation is enforced only in one pass after execution of a shaving operation respectively provide a joint efficiency of 90% or higher, that is, they are excellent in joint efficiency. Also, the results shown in Table 1 tells that the sample, on which a drawing operation is enforced using an oil lubricant, is more excellent in weldability that the sample on which a drawing operation is enforced using a dry-type lubricant. For example, in the case of the sample (c), although a drawing operation is carried out in one pass after execution of a shaving operation, since the drawing operation is a working operation using an oil lubricant, the surface of the thus drawn wire can be cleaned easily by a grease removing treatment to be enforced thereafter, which makes it possible to provide a high degree of weldability. Further, in the samples (a), (b) and (j), on which a shaving operation is enforced after execution of a drawing operation, and the sample (c), on which a drawing operation is enforced only in one pass after execution of a shaving operation, a difference between the hardness of the surface side thereof (surface hardness) and the hardness of the central portion thereof (center hardness) is large, namely, 10 or more. This means that the surfaces of these samples are hardened.

On the other hand, the samples (d) and (f), on which a shaving operation is not enforced but a drawing operation is enforced using a dry-type lubricant, are very poor in weldability and are very low in joint efficiency. The reason for this seems that these samples are ill influenced by substances remaining on the surface thereof such as a coating formed by a coating forming treatment and a lubricant used in the drawing operation. Also, the results shown in Table 1 tell that the coating and lubricant cannot be removed fully even when an alkali cleaning operation is carried out in addition to a grease removing operation. As regards the samples (e) and (g), because of execution of a drawing operation using an oil lubricant, they are little influenced by the remaining coating and lubricant and thus are better in weldability than the above-mentioned samples (d) and (f); however, it seems that they are ill influenced by an oxide or the like, which has been existing since the stage in which they are the extruded material, and are thereby lowered in weldability.

The above-mentioned test example 1 shows that, when manufacturing the magnesium welding wire, execution of a shaving operation is very effective in enhancing the weldability of the welding wire.

Test Example 2

There is prepared the same extruded material (diameter ø 4.0 mm) as the extruded material made of an AZ31 equivalent alloy used in the test example 1, there are produced welding wires each having a diameter ø of 1.2 mm under the same conditions as in the samples (a), (b) and (c) (the quantity of removal by a shaving operation: the area of a drawn wire extending from the surface of the drawn wire down to a position existing 0.1 mm deep from the surface thereof in the transverse section of the drawn wire), and welding is carried out using an MIG automatic welding machine. The results of this test have found that the welding wires raised no problems at all when they are supplied or the like and thus stable welding is possible when they are used. Therefore, it is confirmed that a welding wire, on which a shaving operation is enforced, allows use of an automatic welding machine as well.

Test Example 3

There is prepared an extruded material (diameter ø of 4.0 mm) having a different composition from the magnesium-based alloy used in the above-mentioned test example 1, and there are produced welding wires under the same conditions as in the samples (a) and (c). The composition of the present extruded material is as follows:

(Composition)

Pure magnesium equivalent material: made of Mg of 99.9% by mass or more and impurities.

AM60 alloy equivalent material: made of a magnesium-based alloy containing AL of 6.1% by mass, Mn of 0.44% by mass and, as the remaining contents thereof, Mg and impurities.

AZ61 equivalent material: made of a magnesium-based alloy containing Al of 6.4% by mass, Zn of 1.0% by mass, Mn of 0.28% by mass and, as the remaining contents thereof, Mg and impurities.

ZK60 alloy equivalent material: made of a magnesium-based alloy containing Zn of 5.5% by mass, Zr of 0.45% by mass and, as the remaining contents thereof, Mg and impurities.

And, a welding test is conducted similarly to the test example 1 using the thus obtained welding wires and, according to the joint efficiency thereof, the welding wires are evaluated on the weldability thereof. The test results show that the welding wires having the respective compositions provide a joint efficiency of 90% or higher and are excellent in weldability. Also, similarly to the test example 1, in the transverse section of each of the welding wires, a difference between the surface hardness and center hardness thereof is found. In all of the welding wires, such difference is 10 or more, and the surfaces of these welding wires are hardened.

Although description is given heretofore in detail of the invention with reference to the specific embodiments thereof, it is obvious to those skilled in the art that various changes and modifications are also possible without departing from the spirit and scope of the invention.

The present application is based on the Japanese patent application (Patent application No. 2005-082293) filed on May 22, 2005 and the contents thereof are incorporated herein for reference.

INDUSTRIAL APPLICABILITY

A welding wire according to the invention can be suitably used in welding together parts each of which is made of a magnesium alloy. Especially, the welding wire of the invention is excellent in surface cleanliness and dimensional precision, can be used sufficiently in an automatic welding machine as well, and is capable of stable welding. Also, a method for manufacturing a welding wire according to the invention can be used suitably in manufacturing the above-mentioned welding wire which is excellent in weldability.

The invention claimed is:

1. A magnesium welding wire including:
a wire made of pure magnesium or a magnesium-based alloy, wherein:
the wire has a shaved surface processed by a shaving operation,
a surface portion of the wire is harder than an inner portion of the wire, and
the surface of the magnesium welding wire is substantially free from a coating film and lubricant.

2. The magnesium welding wire as set forth in claim 1, wherein
the Vickers hardness of the wire at a depth of 50 μm from the shaved surface of the wire is higher by 10 HV or more than the Vickers hardness at the center of the wire.

3. The magnesium welding wire as set forth in claim 1, wherein the surface of the magnesium welding wire is substantially free from oxide.

* * * * *